Oct. 28, 1969   G. J. TENNENHOUSE   3,475,225
METHOD FOR PREPARING SOLID STATE IONIC CONDUCTOR
Filed Nov. 21, 1966                                    2 Sheets-Sheet 1

GERALD J. TENNENHOUSE
INVENTOR.

BY
ATTORNEYS

United States Patent Office 3,475,225
Patented Oct. 28, 1969

3,475,225
METHOD FOR PREPARING SOLID STATE IONIC CONDUCTOR
Gerald J. Tennenhouse, Oak Park, Mich., assignor to Ford Motor Company, Dearborn, Mich., a corporation of Delaware
Filed Nov. 21, 1966, Ser. No. 595,707
Int. Cl. H01m 3/02, 11/00, 41/02
U.S. Cl. 136—153                          12 Claims

ABSTRACT OF THE DISCLOSURE

Cationically conductive, polycrystalline structures suitable for use in a variety of devices which are electrically and/or electrochemically actuated, e.g. as half cell separators in batteries employing alkali metal as a reactant, are prepared by intimately mixing aluminum oxide, sodium oxide and lithium oxide, heating the resultant mixture of oxides at crystal-forming temperature until the mixture has been converted into a first cationically-conductive crystalline composition and terminating the heating before this crystalline composition converts to a second crystalline composition, compressing the resultant crystals, and sintering the resultant compressate.

---

This invention relates to an improved method for preparing cationically-conductive, crystalline, articles of manufacture comprising a polycrystalline structural lattice consisting essentially of a major proportion by weight of ions of aluminum and oxygen and a minor proportion by weight of ions of lithium in crystal lattice combination and alkali metal cations that migrate in relation to said lattice under influence of an electric field.

The preparation and use of cationically-conductive structures in accordance with the above description have been disclosed by Matthew A. Dzieciuch and Neill Weber in copending United States patent application Ser. No. 500,500 filed Oct. 22, 1965, now expressly abandoned in favor of their copending United States patent application Ser. No. 604,100 filed Nov. 21, 1966. These structures can be used as cation conductors in a variety of devices which are electrically and/or electrochemically actuated. They are particularly adapted for use as half-cell separators in batteries employing molten alkali metal as a reactant.

These structures are formed from crystals which in turn are formed by heating together at crystal-forming temperatures a mixture of $Na_2O$, $Al_2O_3$ and $Li_2O$. The $Al_2O_3$ comprises a major proportion by weight of the mixture, advantageously above about 80 weight percent and preferably above about 85 weight percent. The $Na_2O$, which may be introduced as $Na_2CO_3$, etc., comprises a major proportion by weight of the remainder, advantageously between about 5 and about 15 weight percent of the total mixture, and preferably between about 8 and about 11 weight percent. The lithium oxide, which may be introduced as $LiNO_3$, etc., comprises a minor proportion by weight of said remainder, i.e. at least about 0.1 weight percent of the total mixture, advantageously about 0.1 to about 5 and preferably about 0.1 to about 1.5 weight percent. Unitary objects may then be formed by admixing the crystals thus prepared with a suitable binder, compressing the bound crystals, advantageously at pressures above about 5,000 p.s.i. and commonly between about 10,000 and 110,000 p.s.i., into the shape and size of the object desired, heating the compressate gradually, e.g. to about 500°–600° C., to remove the binder, and sintering the compressate.

It has been conventional to form such crystals at temperatures below about 1550° C. and to sinter the compressate at temperatures above about 1700° C. Other alkali metal cations, e.g. lithium, potassium, etc., can then be substituted for the mobile sodium ions, if desired.

It has been discovered that if such crystals are sintered at temperatures above about 1550° C., the crystalline structure undergoes transformation to a different crystalline composition. This temperature can be advanced about 50°–100° C. by heating in a closed atmosphere in the presence of excess extraneous sodium ion. A time temperature relationship for providing complete conversion to this crystalline structure comes into operation once the minimum conversion is reached. This change in crystalline structure during the sintering process is undesirable in that it may result in crystalline objects which distort in shape or crack.

It has been discovered that if such crystals are prepared and sintered at temperatures insufficient to effect a significant amount of crystal transformation, objects of superior physical integrity and conductivity can be produced. The aforementioned conversion of crystalline composition may also be effected in the individual crystals prior to sintering.

In accordance with the method of this invention, crystal forming is effected at temperatures below the temperature and/or time-temperature unit requisite for crystal transformation. Thus, crystal forming is effected at temperatures above about 900° C. and below 1650° C., advantageously above about 1000° C. and below about 1600° C., and preferably between about 1250° C. and 1550° C. Crystal forming is effected at temperatures below about 1550° C. when formed in the absence of conversion inhibiting amounts of extraneous sodium ion. At substantially atmospheric pressure, sintering is advisedly effected at temperatures above about 1400° C., advantageously between about 1450° C. and about 1560° C., and preferably between about 1500° C. and about 1540° C.

This invention will be more fully understood from the following examples when read in conjunction with the accompanying drawings, wherein.

EXAMPLE 1

Figure 1:
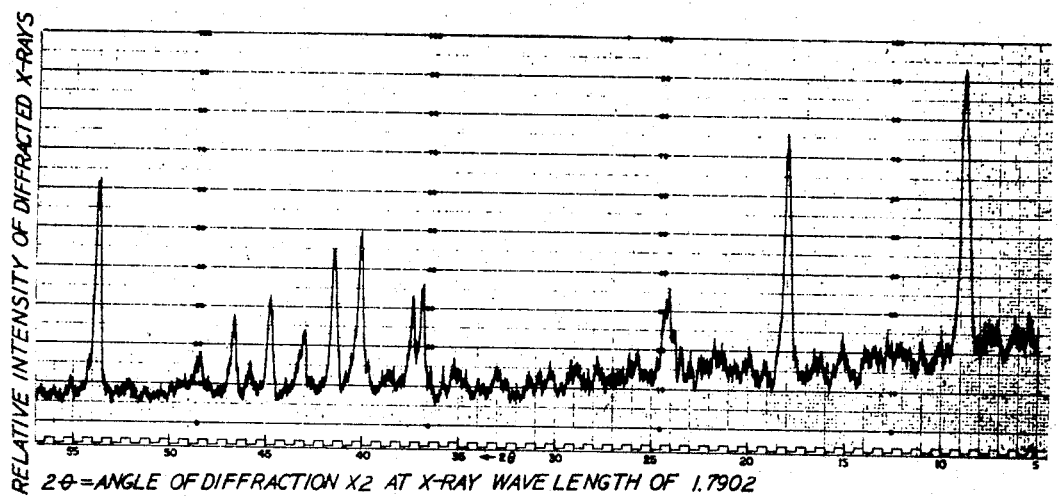
FIGURE 1 is a photograph of a recording which translates into graphic form a defined portion of an X-ray diffraction powder pattern characteristic of the cationically-conductive objects of this invention.

Cylindrical pellets were formed from oxides of sodium, lithium and aluminum in accordance with the following procedure:

(1) In powdered form $Na_2O$ (introduced as $Na_2CO_3$), $Li_2O$ (introduced as $LiNO_3$) and $Al_2O_3$ were added to a vessel and mechanically mixed for 30 minutes. The $Al_2O_3$ employed was in the form of 0.05 micron particles.

(2) The mixture was heated at 1250° C. for one hour to form crystals.

(3) The sample was mixed with a wax binder and mechanically pressed into pellets.

(4) The pellets were then isostatically pressed at 90,000 p.s.i.

(5) The wax binder was removed by gradually heating the pellets to about 550° C.

(6) The pellets were sintered in an electric furnace. During sintering, the pellets were kept in a covered crucible in the presence of packing powder of the same composition as the powders from which the crystals were prepared.

(7) The pellets were weighed and physically measured.

(8) The electrical resistivities of the pellets were measured in the following manner:

(a) The flat opposing surfaces of the sample to be measured were first painted with a saturated solution of silver iodide in ethylene-diamine. The pellet was then heated to 400° C. to remove the ethylenediamine, leaving the silver iodide as a smooth adherent layer. The silver iodide was then covered with silver paint to insure good electrical contact. The resistance was measured at 300° C. using 1.5 m.c. alternating current and the resistivity was calculated.

The weight percent composition of $Na_2O$, $Li_2O$, and $Al_2O_3$ prior to sintering, the sintering time and temperature, the density of the sintered pellets and their specific resistivity are set forth in the following table.

TABLE 1.—ELECTRICAL RESISTIVITIES OF POLYCRYSTALLINE BI-METAL OXIDES FROM $Na_2O$, $Li_2O$, AND $Al_2O_3$

| Wt. Percent Individual Oxides Used in Preparation | | | Sintering Conditions | | Density (g./cc.) | Specific Resistivity (ohm-cm.) 300° C. 1.5 megacycles |
| --- | --- | --- | --- | --- | --- | --- |
| $Na_2O$ | $Li_2O$ | $Al_2O_3$ | Time (hours) | Temp. (° C.) | | |
| 10.08 | 0.16 | 89.76 | 3 | 1,460 | 2.86 | 17.2 |
| 10.08 | 0.16 | 89.76 | 17 | 1,460 | 2.88 | 12.8 |
| 10.05 | 0.33 | 89.62 | 3 | 1,460 | 2.84 | 12.4 |
| 10.04 | 0.49 | 89.47 | 3 | 1,460 | 2.86 | 12.7 |
| 10.02 | 0.66 | 89.32 | 16 | 1,520 | 2.96 | 4.36 |
| 10.02 | 0.66 | 89.32 | 2 | 1,600 | 2.74 | 8.05 |
| 10.00 | 0.83 | 89.17 | 16 | 1,440 | 2.86 | 10.53 |
| 10.00 | 0.83 | 89.17 | 2 | 1,460 | 2.96 | 8.66 |
| 10.00 | 0.83 | 89.17 | 2 | 1,500 | 3.05 | 4.88 |
| 9.99 | 0.99 | 89.02 | 16 | 1,440 | 2.86 | 7.17 |
| 9.99 | 0.99 | 89.02 | 2 | 1,460 | 3.00 | 5.29 |
| 9.99 | 0.99 | 89.02 | 2 | 1,460 | 2.95 | 6.2 |
| 9.99 | 0.99 | 89.02 | 3 | 1,460 | 3.00 | 4.92 |
| 9.99 | 0.99 | 89.02 | 3 | 1,460 | 3.02 | 5.81 |
| 9.99 | 0.99 | 89.02 | 3 | 1,460 | 3.02 | 5.10 |
| 9.99 | 0.99 | 89.02 | 3 | 1,460 | 3.00 | 3.73 |
| 9.98 | 1.14 | 88.88 | 16 | 1,440 | 2.92 | 5.32 |
| 9.98 | 1.14 | 88.88 | 2 | 1,460 | 3.00 | 5.11 |
| 9.98 | 1.14 | 88.88 | 2 | 1,460 | 3.01 | 4.83 |
| 9.98 | 1.14 | 88.88 | 17 | 1,460 | 2.81 | 4.99 |
| 9.98 | 1.14 | 88.88 | 16 | 1,480 | 2.72 | 6.64 |
| 9.98 | 1.14 | 88.88 | 2 | 1,500 | 2.76 | 7.85 |
| 9.96 | 1.31 | 88.73 | 18 | 1,420 | 2.80 | 6.53 |
| 9.96 | 1.31 | 88.73 | 16 | 1,460 | 2.95 | 3.78 |
| 9.96 | 1.31 | 88.73 | 16 | 1,480 | 2.70 | 8.67 |
| 9.96 | 1.31 | 88.73 | 4 | 1,500 | 2.70 | 7.48 |
| 9.96 | 1.31 | 88.73 | 16 | 1,520 | 2.54 | 8.59 |
| 9.96 | 1.31 | 88.73 | 2 | 1,600 | 2.56 | 11.78 |
| 10.48 | 1.31 | 88.21 | 18 | 1,420 | 2.78 | 9.19 |
| 10.48 | 1.31 | 88.21 | 3 | 1,460 | 2.90 | 6.66 |
| 10.48 | 1.31 | 88.21 | 16 | 1,460 | 2.91 | 5.66 |
| 10.48 | 1.31 | 88.21 | 4 | 1,500 | 2.72 | 7.43 |
| 10.48 | 1.31 | 88.21 | 16 | 1,520 | 2.59 | 7.12 |
| 10.48 | 1.31 | 88.21 | 2 | 1,600 | 2.54 | 10.83 |
| 9.84 | 2.52 | 87.64 | 2 | 1,400 | 2.67 | 31.66 |
| 9.84 | 2.52 | 87.64 | 16 | 1,440 | 2.65 | 17.32 |
| 9.84 | 2.52 | 87.64 | 2 | 1,460 | 2.87 | 14.26 |
| 9.71 | 3.97 | 86.32 | 16 | 1,440 | 2.51 | 19.6 |
| 9.71 | 3.97 | 86.32 | 2 | 1,460 | 2.81 | 37.81 |
| 9.71 | 3.97 | 86.32 | 2 | 1,500 | 2.46 | 31.4 |

EXAMPLE 2

Cylindrical pellets were prepared in the same manner as in the preceding example. The pellets were crushed and subjected to chemical analysis to determine the correlation between starting ingredients and the composition of the sintered pellets. The results obtained were as follows:

TABLE 2

| Starting Materials Weight Percent | | Sintering Conditions | | Product Weight Percent | |
| --- | --- | --- | --- | --- | --- |
| $Li_2O$ | $Na_2O$ | Time hrs. | Temp. (° C.) | $Li_2O$ | $Na_2O$ |
| 0.99 | 9.99 | 2 | 1,460 | 1.00 | 9.62 |
| 1.14 | 9.98 | 2 | 1,460 | 1.14 | 9.61 |
| 2.52 | 9.84 | 2 | 1,400 | 2.23 | 9.59 |
| 3.97 | 9.11 | 2 | 1,400 | 3.79 | 9.22 |

EXAMPLE 3

Figure 2:
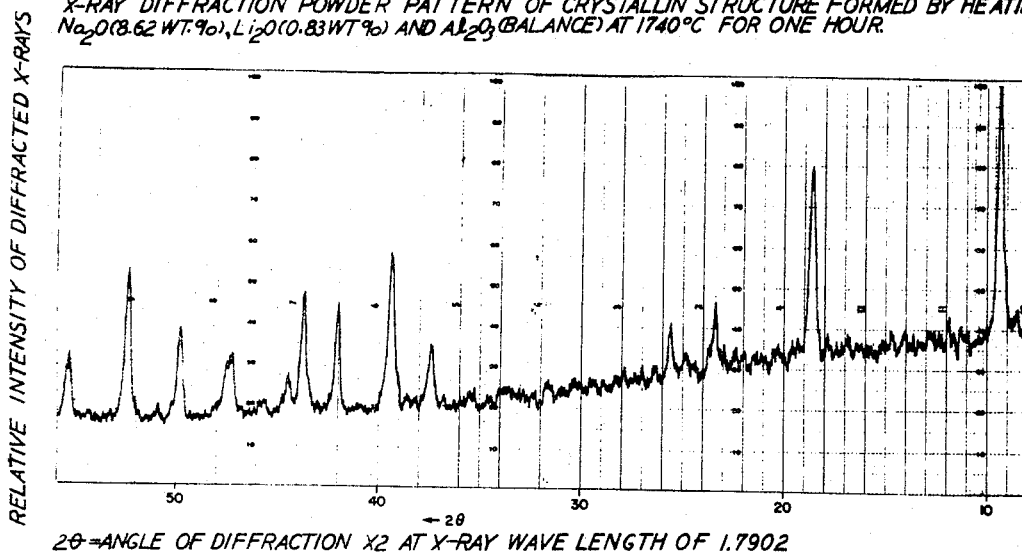
FIGURE 2 is a photograph of a recording which translates into graphic form a defined portion (corresponding) of an X-ray diffraction powder pattern characteristic of a cationically-conductive object prepared in like manner but sintered at higher temperatures.

Cylindrical pellets were prepared in accordance with the method of Example 1 with the original powder composition of 10.0 weight percent $Na_2O$, 0.83 weight percent $Li_2O$, and a balance of $Al_2O_3$. The crystals, which had been formed by heating the powder mixture at 1250° C. for one hour, were subjected to X-ray diffraction powder analysis and an X-ray diffraction powder pattern corresponding to that of FIGURE 1 was obtained, i.e. a pattern having an intensity peak at an angle of 53.5°–54.5° where such angle is equal to twice the angle of diffraction. The crystals were prepared into pellets as in the preceding examples and sintered for 4 hours at 1600° C. in a loosely covered platinum crucible with no extraneous source of sodium ion present. Sample pellets were crushed and submitted to the same analysis and an X-ray diffraction powder pattern corresponding to that of FIGURE 2 was obtained, i.e. a pattern demonstrating intensity peaks at angles of about 52° and about 56° with no intermediate peak at about 53.5°–54.5°.

Sample pellets were then placed in a tightly covered platinum crucible imbedded in $Na_2O \cdot Al_2O_3$ powder and heated at 1420° C. for 16 hours. The pellets were crushed and analyzed as before and an X-ray diffraction powder pattern was obtained corresponding to that of FIGURE 1 demonstrating that the transformation of crystalline structure can be caused to revert under proper conditions.

EXAMPLE 4

Figure 3:
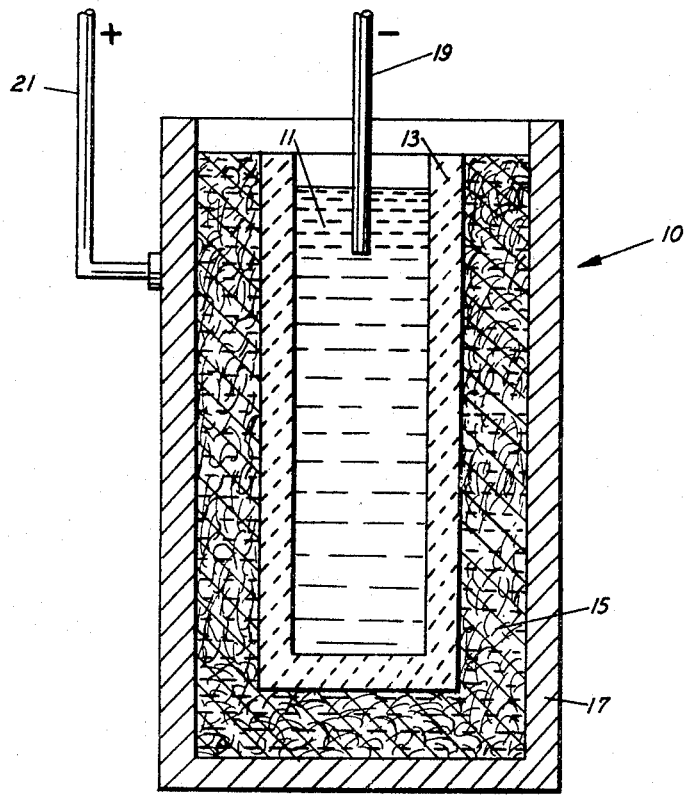
FIGURE 3 is a schematic drawing of a cell or battery illustrating use of a product of this invention as a half-cell separator.

Referring now to FIGURE 3, there is shown a cell 10 which may be one unit of a plurality of cells in series and/or parallel forming a battery. In this embodiment, an anode-reactant, molten sodium 11, is shown within a sodium ion-containing tube 13. In contact with the exterior of tube 13 is a porous conductor 15 immersed in a sulfur-comprising, cathodic reactant-electrolyte. Encasing both 13 and 15 is a metal case, cathode 17. Inside tube 13 in contact with the molten sodium 11 is a conductor 19, e.g. platinum wire, which serves as the negative lead to an external circuit, not shown, which includes a resistance, e.g. a light bulb, D.C. motor, etc., and is in electrical connection with a positive lead, conductor 21. Lead 21 is in electrical contact with cathode 17. The cell may be operated under a blanket of inert gas or suitably sealed by a cover, not shown. The sodium atoms of the anode-reactant 11 yield electrons to the conductor 19 and pass as ions through tube 13 to the cathodic reactant, e.g. $Na_2S_5$ in 15. Sulfur atoms within 15 accept electrons from the external circuit via cathode 17 and the porous conductor of 15.

The porous conductor of 15 may be fibrous sheet material fabricated from graphite or carbon fibers and woven into cloth or felted, porous carbon plates, etc. One example of such materials is disclosed by Lauzos et al. in U.S. Patent 3,214,647.

The metal cathode 17 should be formed of a metal or alloy that resists attack by the sulfur-comprising cathodic reactant, e.g. aluminum lined or coated with chromium, titanium, Chromel, etc.

The tube 13 is prepared in the same manner as the pellets of the preceding examples except that the crystals and wax binder are packed into a mold of corresponding shape prior to compression, e.g. between a tubular rubber mold and a metal core.

For a discussion of conventional X-ray diffraction composition characterization techniques, see "Elements of X-Ray Diffraction" by B. D. Cullity, Addison-Wesley Publishing Co., Inc., Reading, Mass., 1956, Library of Congress Catalog No. 56–10137, particularly "Chapter 7—Diffractometer measurements." See also, "An Introduction to Crystallography" by F. C. Phillips, John Wiley & Sons, Inc., New York, N.Y.

It is to be understood that this invention is not limited to the examples herein shown and described, but that changes and modifications may be made without departing from the spirit and scope of the invention, as defined in the appended claims.

I claim:
1. The method for preparing a cationically-conductive, polycrystalline object which comprises intimately mixing a major component by weight of aluminum oxide and a remainder consisting of a major proportion by weight of sodium oxide and a minor proportion by weight of lithium oxide, heating the resultant mixture of oxides at crystal-forming temperature above about 900° C. and below 1650° C. until said mixture has been converted into a first cationically-conductive crystalline composition and terminating said heating before said first crystalline composition converts to a second crystalline composition, compressing the resultant crystals into an object of the desired shape and size, and sintering the resultant compressate at a temperature in the range of above 1400° C. and below about 1650° C. for a time sufficient to unite the individual crystals of said compressate into a unitary polycrystalline object and insufficient to effect conversion of the crystals to a second crystalline composition.

2. The method of claim 1 wherein said crystals are admixed with a volatilizable binder prior to compression and before sintering the temperature of the resultant compressate is gradually increased until volatilization of said binder is essentially complete.

3. The method of claim 1 wherein said crystals are formed and sintered at temperatures insufficient to convert said first crystalline composition to said second crystalline composition.

4. The method of claim 1 wherein said crystals are formed and sintered at a temperature and for a time insufficient to convert said first crystalline composition to said second crystalline composition.

5. The method of claim 1 wherein said crystal-forming temperature is in the range of about 1000° C. to about 1500° C. and said compressate is sintered at a temperature in the range of about 1450° C. to about 1560° C.

6. The method of claim 1 wherein said crystal-forming temperature is in the range of about 900° C. to about 1540° C.

7. The method of claim 1 wherein said compressate is sintered at a temperature in the range of about 1500° C. to about 1540° C.

8. The method of claim 1 wherein said crystals are compressed at a pressure in excess of about 5,000 p.s.i.

9. The method of claim 1 wherein said crystals are compressed at a pressure in the range of about 10,000 to about 110,000 p.s.i.

10. The method of claim 1 wherein said first crystalline composition is characterized by an X-ray diffraction powder pattern crystallographically equivalent to the X-ray diffraction powder pattern of FIGURE 1 and said second crystalline composition is characterized by an X-ray diffraction powder pattern crystallographically equivalent to the X-ray diffraction powder pattern of FIGURE 2.

11. The method of claim 1 wherein said aluminum oxide comprises at least about 80 weight percent of said mixture, said sodium oxide comprises about 5 to about 15 weight percent of said mixture and said lithium oxide comprises at least 0.1 weight percent of said mixture.

12. The method of claim 1 wherein said aluminum oxide comprises at least about 85 weight percent of said mixture, said sodium oxide comprises about 8 to about 11 weight percent of said mixture and said lithium oxide comprises about 0.1 to about 1.5 weight percent of said mixture.

References Cited

UNITED STATES PATENTS 3,404,036   10/1968   Kummer et al. _____ 136—6

WINSTON A. DOUGLAS, Primary Examiner

D. L. WALTON, Assistant Examiner

U.S. Cl. X.R.

106—46, 65; 136—146